United States Patent [19]

Sewell

[11] Patent Number: 4,615,533
[45] Date of Patent: Oct. 7, 1986

[54] METHOD AND APPARATUS FOR IMPROVED OPERATION OF PALLET TRUCKS

[76] Inventor: Daniel W. Sewell, P.O. Box 2592, Sparks, Nev. 89432

[21] Appl. No.: 707,652

[22] Filed: Mar. 4, 1985

[51] Int. Cl.⁴ .............................................. B62D 33/08
[52] U.S. Cl. ................................ 280/43.12; 280/43.23
[58] Field of Search ................ 280/43.12, 43.23, 766.1

[56] References Cited

FOREIGN PATENT DOCUMENTS

2617130 10/1977 Fed. Rep. of Germany ... 280/43.12
750053 6/1956 Switzerland ...................... 280/43.12

*Primary Examiner*—John J. Love
*Assistant Examiner*—Richard M. Camby
*Attorney, Agent, or Firm*—Herbert C. Schulze

[57] ABSTRACT

This is a method and an apparatus for performing the method by which the operation of pallet trucks used in warehousing and the like is greatly improved and enhanced and additionally is made more safe. The method employs a use of auxiliary hydraulic operated wheels or similar device for taking the weight off of pallet truck forks momentarily while entering or exiting from a pallet. The wheels or other mechanical device cause a slight lifting at the point adjacent the battery section of battery operated pallet trucks.

3 Claims, 16 Drawing Figures

METHOD AND APPARATUS FOR IMPROVED OPERATION OF PALLET TRUCKS

CROSS REFERENCE TO RELATED PATENT APPLICATIONS

There are no patent applications filed by me related to the within application.

BACKGROUND OF THE INVENTION

1. Field of the Invention

This invention is in the general field of pallet trucks; the invention is more particularly directed to a method and apparatus for improved and safer operation of pallet trucks; the method and apparatus are even more directly related to a means where the use of auxiliary lifting mechanism to momentarily take the weight from the forks on pallet trucks while entering or exiting a pallet.

2. Description of the Prior Art

There is absolutely no prior art known to me for momentarily removing the weight of forks of a pallet truck while entering or exiting a pallet.

SUMMARY OF THE INVENTION

In warehousing and in many other commercial and industrial operations, pallet trucks are used extensively. Many of the pallet trucks have a platform upon which the operator stands and where the controls are located which platform has wheels and many do not have a platform but in which case the operator walks beside the pallet truck. Additionally, at the area where the operator is located there is usually a battery source of electrical power for operations and means to elevate the forks a given distance when a pallet has been engaged by the fork. The forks extend outwardly from the platform and generally have wheels which are so disposed that they are near the end of the fork and they are so arranged that when the pallet is lifted the wheels have a cam or other action which allows them to extend downwardly to accommodate for the lifting of the pallet and its load whatever it may be.

When an operator is placing the forks into the pallet, particularly when an empty pallet or a pallet with a light load, the weight of the forks is such that the forks and their wheels will push a pallet and slide it across the floor rather than entering smoothly. When this occurs the operator will find it necessary to push a pallet until it comes against some other object which resists the sliding. Alternately, it becomes necessary for another person to hold the pallet against movement. When this is done it is customary to push against the pallet with a foot. This can be quite dangerous as people are frequently injured by the pallet somehow slipping a little further and a foot becoming badly injured by the movement of the pallet. When a pallet is pushed against another object, this is frequently another pallet or some of the goods being moved or a portion of the building. Frequently the goods being moved which are being pushed against will become damaged and portions of the building against which the pallets is pushed may be badly damaged.

It is to be understood that in referring to backing and going forward, there are some terms generally used in the industry which may or may not be applicable to this application. For example where the words are found forward and backward it may actually be the reverse of those used in the application. Within the application, wherein forward is used, it means only entering the forks into the pallet lifts and backward means only drawing them out. In most cases these terms will be absolutely the reverse as to those skilled in the arts.

By background it must be realized that since the pallet trucks are alternately utilized by walking operators or those standing on a platform, that many of the terms will not necessarily be totally descriptive.

It must be understood that the invention herein involves any method of lifting the forks the remove the weight thereof so as to avoid pulling or pushing whatever direction may be involved of the empty or lightly loaded pallet. The sole purpose of this invention and the method involved must be examined in that connection and that is that there will be no weight upon the forks which will cause the pallet to move either direction.

The same situation occurs in reverse when the forks are being removed from a pallet in that the weight of the forks and the wheels where there is an empty pallet or a lightly loaded pallet will hang up on the pallet and the pallet will be dragged across the floor as the operator attempts to back up the pallet truck. In such an instance as this, it is customary for an operator to try to reach forward with his foot to hold the pallet against movement while he still attempts to operate the pallet truck in its reverse position. This is extremely dangerous and many injuries of a severe nature result from this. Alternately, another person may be called upon to attempt to hold the pallet against movement and once again it is customary to use a foot against one corner of the pallet or to attempt to hold it by hand in each of which case injuries frequently result.

Thus, because of this action of pallet trucks in causing pallets to be pushed or dragged across a floor there is much unnecessary damage to products and buildings and usually to operators and others.

I have studied this problem extensively and have discovered that I am able, by auxiliary mechanical means, to lift the weight from the forks by properly applying pressure adjacent the position at which the forks are attached to the operator's platform. This relieves the pressure on the forks so that they slide smoothly in and out of the pallets without the problems as heretofore described.

In a preferred form of my invention I cause a pair of hydraulic actuated wheels to move downward adjacent the front of the operator's platform and to raise the platform at that point approximately one inch. This has the effect of removing most of the weight from the front end of the forks allowing the forks to enter and exit a pallet smoothly and with none of the dragging and sliding of the pallets over the floor which previously existed.

The use of this auxiliary lifting of the weight from the forks required additional features since the pallet truck may not handle properly under relatively high speed transport with this extra carrying position. Additionally, such auxiliary lifting must be carefully and completely removed from the possible obstructions on the floor such as cracks and the like since under high speed transport conditions, particularly, the truck may go out of control if the wheels or other means used for this lifting should hit such obstructions. Therefore, the invention includes in some aspects certain alternate safety features. These include a disabling of high speed transport mode for pallet trucks during the time the auxiliary wheels are in position, the total disabling of movement of the pallet trucks during those periods in which the auxiliary lifting mechanism has not been fully retracted or extended, and the like.

It is an object of this invention to provide a method and an apparatus by which the weight on the forks of a pallet truck may be momentarily lightened at both times when the truck is either entering or exiting from a pallet.

Another object of this invention is to provide such a method and apparatus as has been described wherein there will be built in safety features so that there can be no danger when the forks are in a momentarily lightened condition.

Another object of this invention is to provide such a method and apparatus as has been described wherein there will be no possibility of damage to a product or injury to a person due to difficulty of pallet truck forks entering or exiting from a pallet.

The foregoing and other objects and advantages of this invention will become apparent to those skilled in the art upon reading the descriptions of a preferred embodiment which follows, in conjunction with a review of the appended drawings.

DESCRIPTION OF A PREFERRED EMBODIMENT

Figure 1:
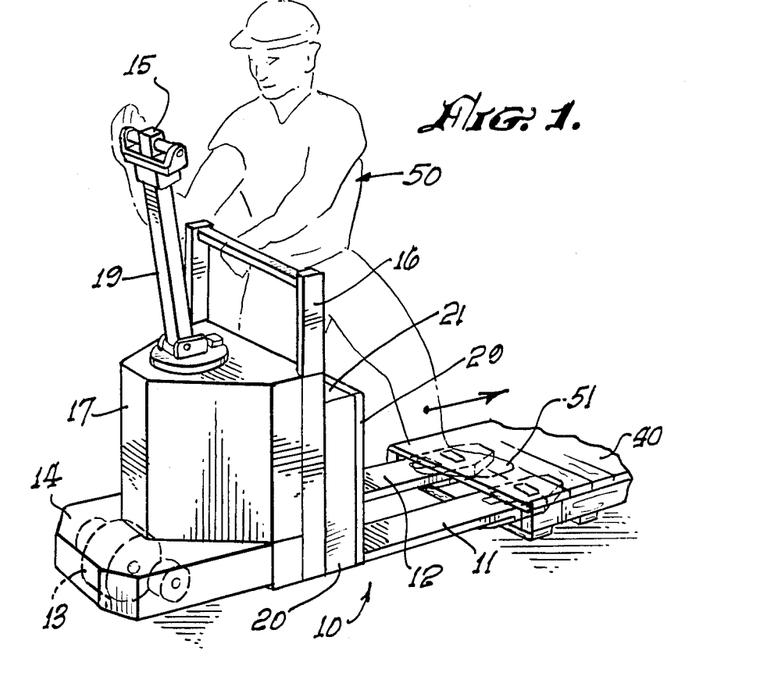
FIG. 1 is an illustration of pallet operator having difficulty removing the forks from an empty or lightly loaded pallet.
Figure 2:
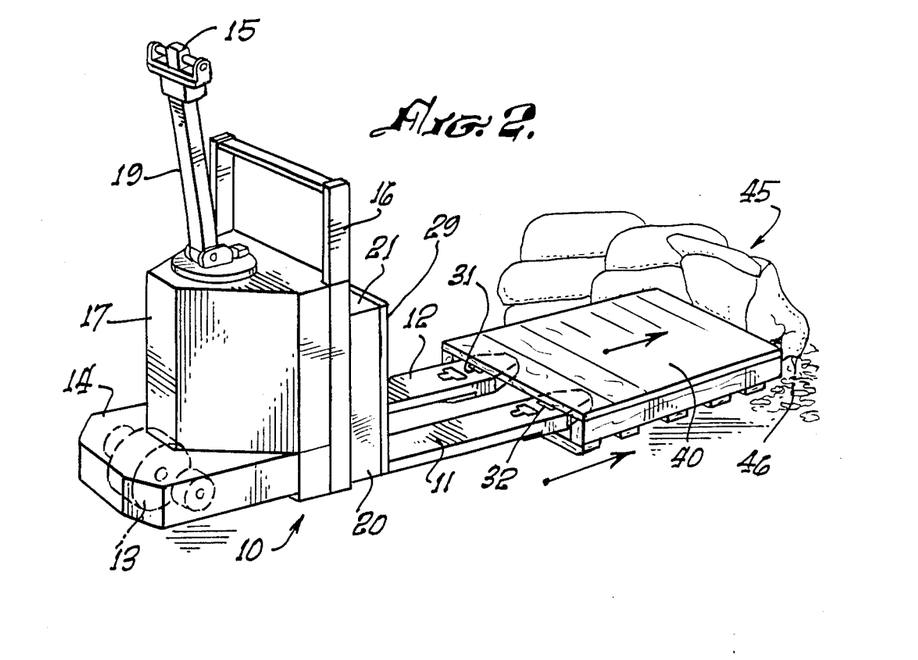
FIG. 2 is an illustration showing the damage which can occur to goods when a pallet is being moved due to difficulty of entering it with the forks.

FIGS. 1 and 2 show a pallet truck generally 10 of usual and customary construction and illustrate the problem which this invention solves. The pallet truck, generally 10, has a drive wheel 13 which is operated by an electric motor or the like as is well known to those skilled in the art. The pallet truck also has a pair of forks 11 and 12 which have wheels 31 and 32. The truck is essentially operated by running on the drive wheel 13 together with any auxiliary balancing wheels and the wheels mounted in the forks which wheels are indicated by the numerals 31 and 32. The battery or the like 21 is carried in a battery case 20 which is mounted in the manner known to those skilled in the art in such manner that it is lifted or lowered by means of a customary hydraulic cylinder or the like. When the battery carrier 20 is lifted, the wheels 31 and 32 are activated by a customary linkage such as is generally indicated in FIG. 6 again, in a manner complete known to those skilled in the art. Thus, the pallet truck may run with no load whatsoever on it resting upon the two wheels 31 and 32 and the drive wheel 13 or, it may be operated when there is a load and the forks are lifted (or without a load and the forks lifted) wherein the wheels are pulled downward and the forks are lifted and there is still the essential operating condition.

The problem with this type device as shown in FIGS. 1 and 2 arises in that under many conditions, the forks, when entering a pallet which is resting upon the floor as is shown in FIG. 2, will hang up either by the wheels themselves, or by the end of the forks on the lower points of a pallet. In such condition, it becomes necessary for the operator to maneuver the apparatus, frequently running up against other cargo as is illustrated in FIG. 2. In the case illustrated in FIG. 2, the truck generally 10 has been operated until the pallet 40 comes into contact with some object, which frequently is cargo of value such as sacks of grain or the like 45. In this case, then, the cargo itself is frequently damaged by the contents spilling from a damaged sack or the like as indicated at 46. Once the pallet 40 has been stopped by such cargo then the forks may enter the pallet for appropriate lifting of the pallet.

In FIG. 1, a reverse situation is seen. In this case, it is attempted to withdaw the forks 11 and 12 from the pallet 40. The operator may normally stand upon a platform 14 or may normally walk alongside the pallet truck utilizing the handle 19 and controls 15 to appropriately activate the functions of the truck. The operator, generally 50, frequently has to attempt to operate the truck from the side and in the vicinity of the forks while placing his foot 51 against the pallet 40 so as to allow the withdrawal of forks 11 and 12 without dragging the pallet along with it.

In the condition indicated in FIG. 1 there have been severe injuries, again known to those skilled in the art, due to this dangerous condition of attempting to operate the vehicle from an unnatural position and with a foot being quite vulnerable to being caught between the the pallet and the forks or otherwise causing damage or injury.

All pallet trucks of this nature (riding between a drive wheel and wheels on the end of the forks) have this common deficiency resulting in a great loss of money due to damaged goods as well as a loss of money and severe injury due to operator or other personnel being injured in connection with attempting to have the forks of the lift truck enter or exit from the pallet without pushing or dragging the pallet about the floor.

Figure 3:
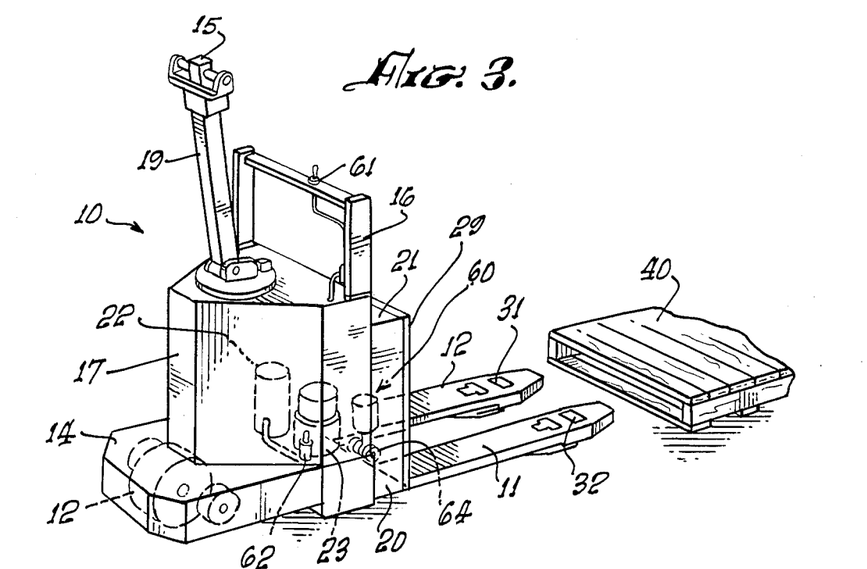
FIG. 3 is a schematic perspective of a pallet truck equipped with means to practice the method of this invention.
Figure 4:
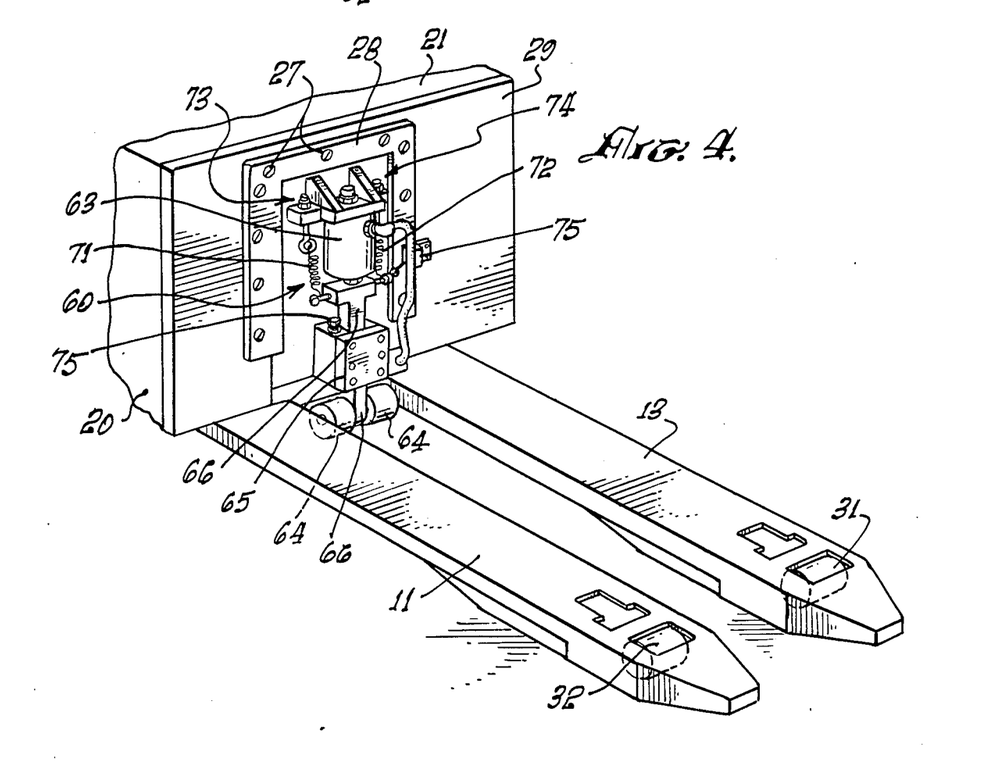
FIG. 4 is a partial enlarged view showing in more detail elements involved in means to practice the method of this invention.

Some attempts have been made to cure this problem by having tapered ends on the forks as are shown in FIGS. 3 and 4, particularly. However, because of the weight involved this type of attempt to cure the problem has never worked satisfactorily.

Examining particularly FIGS. 3 and 4 at this time the general method of this invention is clearly illustrated.

In this case, the identical pallet truck shown in FIGS. 1 and 2 and indicated generally by the numeral 10 is shown with a schematic illustration of a device to practice the method of this invention.

In this case, an auxiliary device generally 60 has been added to the outside cover 29 of the battery container 20. An activating cylinder has been added as a part of this apparatus. The overall apparatus comprises a pair of wheels 64 carried by an appropriate movable axle 66a activated upwardly and downwardly through an appropriate slide bearing arrangement 65-66. There is a secondary hydraulic cylinder 63 mounted generally as indicated on a plate 28 fastened to the battery container cover by appropriate bolts 27 or the like. A pair of springs or the like 71 and 72 are provided to return a single acting hydraulic cylinder when desired. In this case, there is an auxiliary switch 61 mounted upon the framework of the pallet truck as indicated. Importantly, there is added a three way valve 62 shown schematically which can shift the flow of fluid from the lift cylinder 22 which is customary upon a pallet truck to the lift roller cylinder 63.

A limit bolt for stopping the action at a desired position is indicated at 75.

In operation the auxiliary lift rollers 64 lift the forks 11 and 12 a small amount (one half inch to an inch and a half) so that the ends of the forks, with their wheels 31 and 32, no longer hang up on the pallet 40 as they enter or exit the pallet.

More details are shown on this particular preferred embodiment in FIGS. 5, 6, 7, 8 and 9. It will be noted that the entire lift roller mechanism in encased within a cover generally 80 so as to be safe and not likely to interfere with cargo or personnel. The wheels 64 are shown as is the stop position 67 which can adjust the amount of travel of the wheels 64 which are forced downward against the floor 100 by the action of hydraulic cylinder 63. The entire mechanism is fastened as previously indicated to the battery box cover 29.

Figures 5, 6:
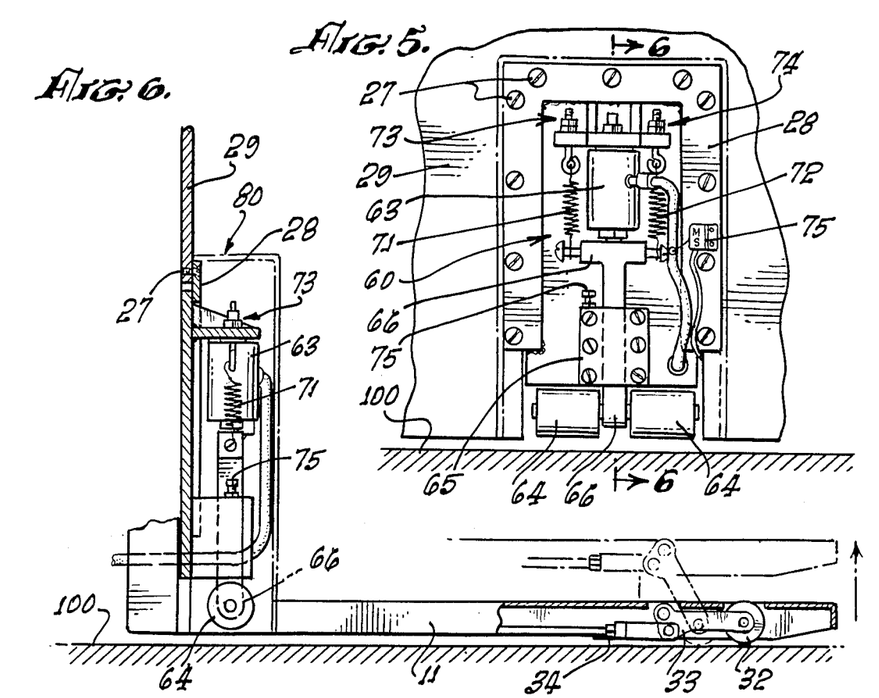
FIG. 5 is a somewhat schematic and detailed partially broken away view of the preferred embodiment of the device to practice the method of this invention as previously shown in FIG. 4.
FIG. 6 is a partially sectioned partially broken away schematic side view of the pallet truck of FIG. 3 and illustrates the weight handling wheels at the ends of the forks and their operation.

The illustration of FIG. 5 shows, as well as the features of the item, the manner in which the wheels will lift the forks and the forks and the load will ride upon them when the forks are down.

At this point a caveat is necessary that it would be unsafe under many conditions to have the auxiliary wheels down all of the time, since it would interfere, particularly on uneven floors, with proper operation of the pallet truck. Thus, these auxiliary wheels should not always be down in position.

When the auxiliary wheels are down, however, in contact with the floor, the forks are lifted slightly but the wheels of the forks do not activate since the activation has been deactivated by the auxiliary switch as will be understood in viewing subsequent drawings.

Figures 7, 7A, 8, 9:
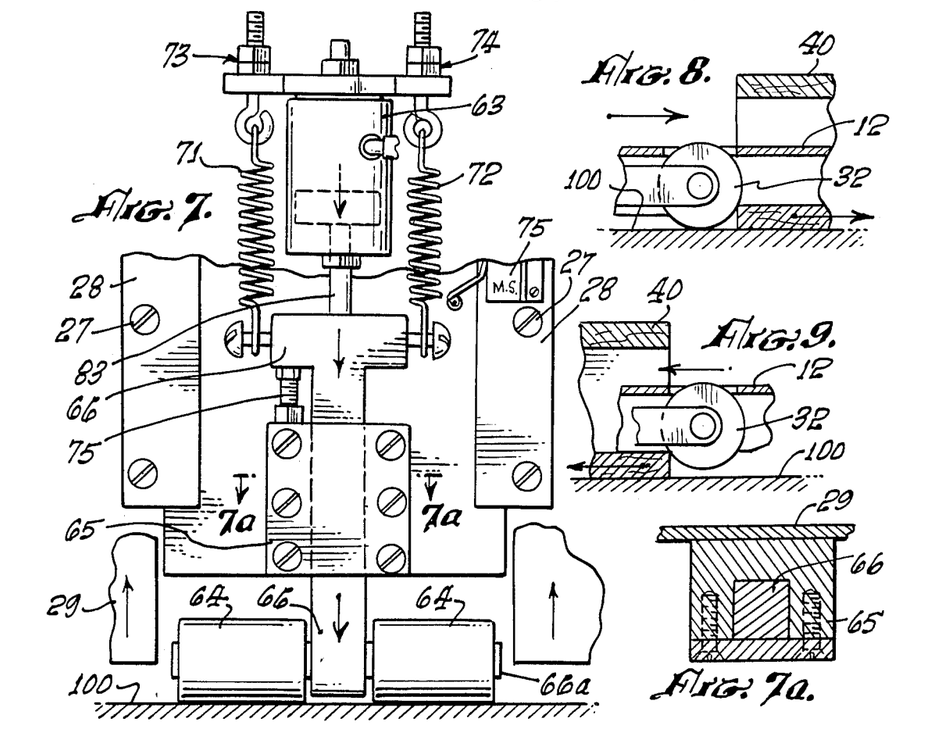
FIG. 7 is a more detailed schematic and partially broken away view showing the mechanism of the preferred embodiment of this invention shown in FIG. 4.
FIG. 7a is a section on 7a—7a of FIG. 7.
FIG. 8 illustrates the method of entry of the forks of a pallet truck into a pallet before this invention.
FIG. 9 illustrates the difference when this invention is used as compared to FIG. 8.

FIG. 7 shows in more detail the springs 71 and 72 which are held by I-bolts or the like 73 and 74 to a framework connected to, or associated with, the activating cylinder 63. Cylinder rod 83 is connected to the wheel carrier 66, which carries the wheels 64 as indicated upon axle 66a.

The construction of this entire mechanism will be clear to anyone skilled in this art or in any of the mechnical arts. The activation of cylinder 63 to force the piston rod 83 downward results in the wheels 64 contacting the floor 100.

The results of this contacting of the floor is clearly shown in FIGS. 8 and 9 wherein FIG. 8 shows the wheel 32 in contact with the floor and shows the fork 12 both hanging up on its own as well as with the wheel on pallet 40. FIG. 9 shows how the wheel 32 has now been lifted in such manner that it easily enters and clears the pallet. The fork in no manner now touches the pallet and the wheel is sufficiently clear to roll over the pallet and into or out of the pallet. FIG. 7a merely shows how the auxiliary wheel carrier 66 rides within a block or the like 65 attached to battery cover 29.

Figure 10:
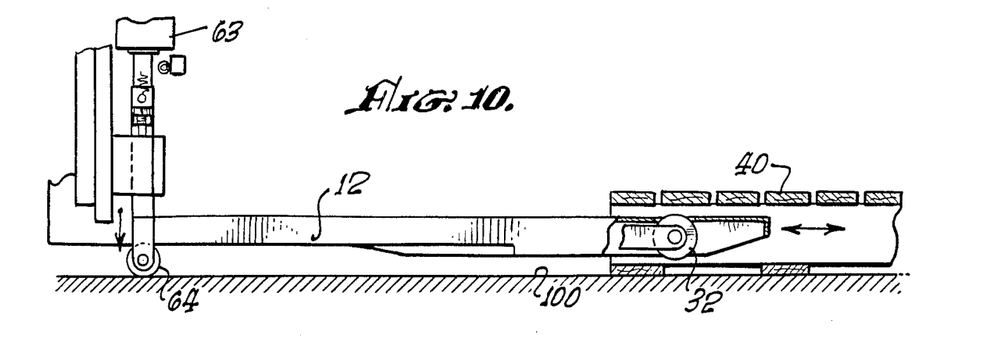
FIG. 10 illustrates a pallet truck fork entering a pallet using the method of this invention.

FIG. 10 really comes to the heart of the method of this invention as well as the apparatus. The auxiliary cylinder 63 is shown as are the auxiliary wheels 64. The fork 12 (and recognizing that there is another fork on the other side) has now been lifted, and it has no choice but to be lifted so that it clearly and cleanly enters the pallet 40 without hanging up on any portions of the pallet. It also exits in the same manner.

Figure 11:
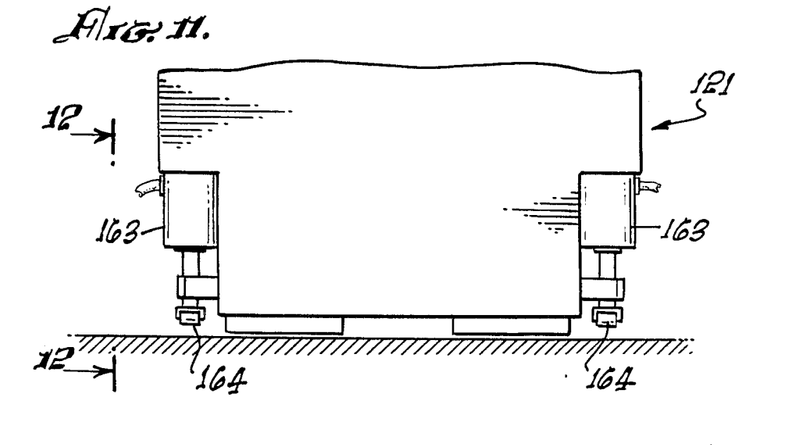
FIG. 11 is a schematic partially broken away view of an alternate embodiment of a device to practice the method of this invention.
Figure 12:
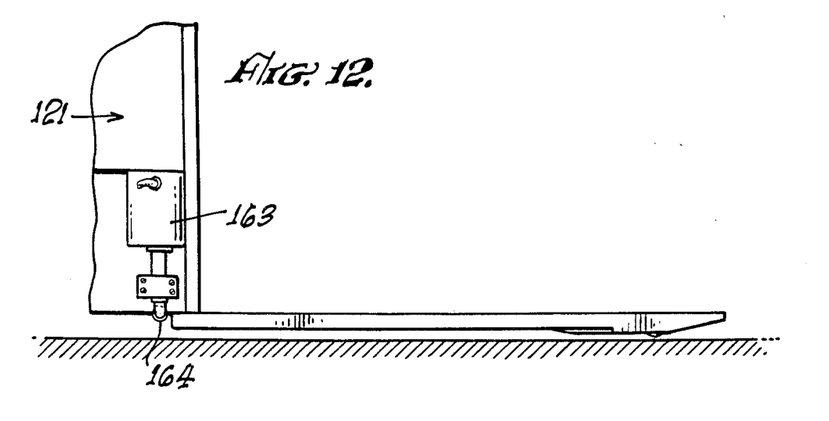
FIG. 12 is a side elevation on FIG. 11.

FIG. 11 is an alternate embodiment wherein the battery container has been altered so as to provide for a pair of auxiliary wheels on the outside of the forks, the pair being 164, and two cylinders being provided 163, Thus, without losing any space between the battery container and the end of the forks the same result is accomplished. In this case the battery is shown at 121. The container has been modified to accommodate the auxiliary cylinders 163 which activate the wheels 164 to any appropriate carrier arrangement which will be quite clear to those skilled in the art.

Figures 13, 14, 15:
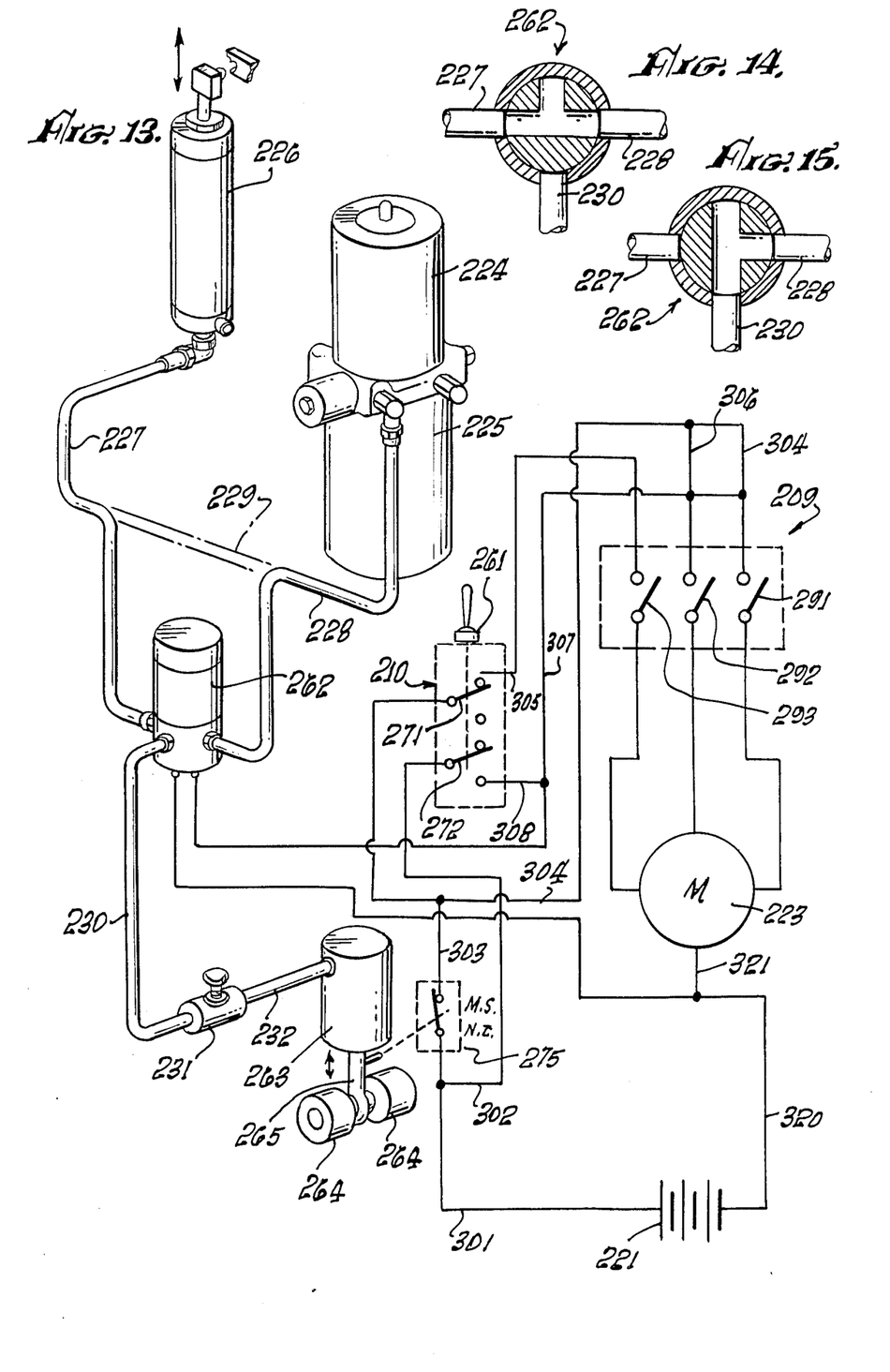
FIG. 13 is a schematic view of hydraulic and electric circuitry to perform the method of this invention on a pallet truck.
FIG. 14 is a schematic view of the interior passageway of a solenoid valve shown in FIG. 13 showing the valve in the normal pallet truck operating position.
FIG. 15 is a view of the same nature as FIG. 14 except showing the position of the valving in the auxiliary mode to practice the method of this invention.

The heart of any and all versions of an apparatus to carry into effect the method of this invention is well illustrated schematicaly in FIGS. 13, 14 and 15. The normal operating circuits of pallet trucks will usually involve one, two, or three speeds. The speeds are accomplished by a somewhat more complex control mechanism than shown in the schematic view FIG. 13, but are understood by those skilled in the art. The essential elements of a safe operation of this nature are indicated. The normal pump and hydraulic fluid reservoir 224 and 225 are illustrated with the conduit 228 normally continuing through conduit 227 by the element indicated at 229 being merely a closed circuit. The normal fork lift cylinder 226 can be single or double acting. In this case a single acting cylinder is indicated wherein it will be spring loaded by means known to those skilled in the art so it will return and the fluid passing through lines 228, 229 and 227 will either be forced under pressure to actuate the lift ram handled by cylinder 226 or will return to the reservoir. This is an elementary hydraulic procedure understood by those skilled in the art.

In practicing this invention, however, the fluid from the pump and reservoir 224 and 225 is carried by the complete piping circuit 228 to a three way solenoid operated valve 262. This valve then has one circuit flowing to conduit 227 to actuate the fork lift ram 226. It has another circuit, however, 230 flowing to a flow control valve 231 to limit the speed of actuation of the auxiliary wheels and from the flow control valve 231 to conduit 232 into auxiliary ram 263 which actuates and raises or lowers wheels 264 by appropriate carrying mechanism 265, whatever it may be, but a simple mechanical feature known to those skilled in the art. Additionally, however, there is electrical circuitry which is involved. It will be noted that the electrical source of power battery221 flows in one direction through appropriate conducting wires 301 which then divides into 302 and 303 conducting lines, with a micro switch or the switch 275 indicated at an interruption point in the conduit 303. 303 then connects to an electrical carrying conduit 304 which goes in one direction to switch 270 at contact 271. In the other direction it goes to electrical carrying conduit 306 and the continuation of 304 connected as illustrated to electrical conduit 307. These particular connections then lead to drives 2-1 and 2-2 through switches 291 and 292 which are controlled by the operator. This gives a low speed and an intermediate speed to the pallet truck drive motor 223. The circuit is completed through electrical connection 321 to 320 leading to the other side of the battery 221.

My auxiliary switch 261 controls the entire operation and either connects or disconnects the electrical line 305 at the same time connecting or disconnecting but in reverse order the line 308 which connects to line 307. When my auxiliary switch is so positioned that the switch 272 connects line 302 to line 308, the solenoid valve is activated and at the same time line 307 activates only the two lower speeds of the pallet truck (there may only be one lower speed in some trucks).

When that switch is thrown at the same time the main controls are totally disconnected through the switch 271 which is a part of the single acting double thro switch 270. It is impossible for the pallet truck to be operated in a high speed condition when the wheels or other lifting apparatus 274 are activated. This is most important since there could be a dangerous condition if the auxiliary wheels were in place all of the time during operation, as previously outlined, because of unevenness of floors and the like.

The micro switch 275 serves an additional function. That is, that if the micro switch is open, which is only when the wheels are down, then no power whatsoever can reach the main opeating switch. Thus, if the auxiliary switch is not on, which limits the speed of the truck, the truck will be totally inoperative. This is an unusual safety precaution which has been placed in the circuit. Switch lever 261 simultaneously moves switch contacts 271 and 272 one open and one closed.

FIG. 14 shows the condition under normal circumstances of operation wherein the conduit 227 connects directly through to conduit 228 and there is no possibility of flow to conduit 230.

FIG. 15 shows the situation when my auxiliary switch has been thrown and that is that the valve now connects between lines 228 and 230 thus providing oil pressure only to my auxiliary hydraulic cylinder 263.

It should be clearly understood that the method of this invention involves primarily the lifting of the portion of the pallet truck adjoining the battery during periods when the forks are in their lower or retractive position. I recognize that there are other ways that those skilled in this art might attempt to circumvent the particular, and preferred embodiments, shown. However, the end result would be the same and would involve utilizing my method which consists of lifting the forks from their normal contact with the floor by an auxiliary means cooperating with the drive means. For example, it is conceivable that a mechanical cam action might be used for this purpose; it is conceivable that an externally activated lifting device might be utilized.

While the embodiments of this invention shown and described are fully capable of achieving the objects and advantages desired herein, it is to be understood that this method includes all of the same and is not to be construed as limiting in any manner.

I claim:

1. In the operation of a pallet truck having power supply means; a driving wheel bearing upon an operating surface associated with said power supply means; two forks, each comprising an elongated member associated with said power supply means at a first end and carrying a wheel normally in contact with said operating surface adjacent a second end at a spaced distance from each other, and suitable to be inserted into a cargo pallet having a top cargo carrying platform and a bottom platform to rest upon the operating surface when not being transported, and with an opening on one side suitable to receive said forks between said top and bottom platforms: the method of lifting the ends of the forks having wheels adjacent said ends for insertion of said forks into, or withdrawal of said forks from, an opening between said top and bottom platforms comprising applying a pressure device intermediate said drive wheel and the wheels adjacent the second end of said forks, wherein the pressure device is a slidable wheel which, when forced downwardly causes the weight of the pallet truck to be carried by the drive wheel and the slidably mounted wheel during insertion into or withdrawal from said pallet of said forks and wherein the slidably mounted wheel is activated by hydraulic fluid means normally used in cooperation with said power supply means to raise or lower said forks in relation to the operating surface in such manner as to raise or lower said pallet and wherein during the activation of the slidable mounted wheel the power to elevate the forks (except by the slight elevation caused by the lifting of the truck itself by the slidably mounted wheel) is made inoperative, and wherein the pallet truck is caused to be inoperable at high speeds during such time as the slidably mounted wheel is exerting lifting pressure by being forced downward against the operating surface.

2. In combination with a pallet truck having power supply means; a driving wheel bearing upon an operating surface associated with said power supply means; two forks, each comprising an elongated member associated with said power supply means at a first end carrying a wheel normally in contact with said operating surface adjacent a second end at a spaced distance from each other, and suitable to be inserted into a cargo pallet having a top cargo carrying platform and a bottom platform to rest upon the operating surface when not being transported, with an opening on one side suitable to receive said forks between said top and bottom platforms: means to provide for improved insertion and removal of the pallet truck forks into the opening between the top platform and the bottom platform of a pallet including a lifting apparatus mounted to said pallet truck at a point intermediate the driving wheel of the pallet truck and the ends of the forks of the pallet truck bearing wheels; means to activate said lifting means in such manner as to relieve weight on the base upon which the pallet truck is resting from the wheels adjacent the ends of the forks while the pallet truck forks are being inserted into, or withdrawn from, a pallet, wherein the means to relieve the weight comprises a slidably mounted wheel activated by an hydraulic ram activated by an hydraulic power source in combination with the power supply means which hydraulic power source is normally used to lift the forks of the pallet truck in order to lift a pallet loaded with cargo, and wherein means are provided to prevent operation of the forks of the pallet truck for elevating a load during the time the slidable wheel is actively in contact with the operating surface, and wherein means are provided to interrupt and prevent high speed operation of the pallet truck at such times as the slidable wheel is not fully retracted from its position of pressure contact with the base upon which the pallet truck is resting.

3. An apparatus for improving the operational characteristics of a pallet truck having battery power supply means; a driving wheel bearing upon an operating surface associated with said battery power supply means; two forks, each comprising an elongated member associated with said power supply means at a first end carrying a wheel normally in contact with said operating surface adjacent a second end at a spaced distance from each other, and suitable to be inserted into a cargo pallet having a top cargo carrying platform and a bottom platform to rest upon the operating surface when not being transported, with an opening on one side suitable to receive said forks between said top and bottom platforms: comprising means for improved insertion or withdrawal of the forks of a pallet truck from a pallet comprising in combination an hydraulic cylinder mounted adjacent the battery power means of a battery power means operated pallet truck; a slide connected to a ram operated by said hydraulic cylinder slidably mounted adjacent the battery power means of a battery power means operated pallet truck; at least one wheel mounted upon an axle carried by said slidably mounted ram and capable of being moved by the hydraulic clyinder into pressure contact with the base upon which the pallet truck rests and conversely removed from such pressure contact by release of hydraulic pressure in said hydraulic cylinder; auxiliary switching means to provide for the diversion of hydraulic power from an hydraulic power fork lifting apparatus to the hydraulic cylinder activating the slidably mounted ram; auxiliary electrical interruption means which interrupt the ability of the pallet truck to move at high speeds during time when the slidably operated pressure wheel is in pressure contact with the base upon which the pallet truck rests, and means to inhibit the high speed traveling characteristics of the pallet truck during such time as the slidably mounted wheel is not fully retracted.

* * * * *